(12) United States Patent
Won (10) Patent No.: US 11,325,643 B2
(45) Date of Patent: May 10, 2022

(54) APPARATUS FOR DETECTING STEERING ANGLE, STEERING SYSTEM, AND TORQUE SENSING METHOD OF STEERING SYSTEM

(71) Applicant: MANDO CORPORATION, Gyeonggi-do (KR)

(72) Inventor: Woo Seok Won, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 194 days.

(21) Appl. No.: 16/178,567

(22) Filed: Nov. 1, 2018

(65) Prior Publication Data

US 2019/0135338 A1 May 9, 2019

(30) Foreign Application Priority Data

Nov. 3, 2017 (KR) .................. 10-2017-0145701

(51) Int. Cl.
*B62D 6/10* (2006.01)
*G01L 5/22* (2006.01)
(Continued)

(52) U.S. Cl.
CPC .............. *B62D 6/10* (2013.01); *B62D 5/0463* (2013.01); *B62D 15/021* (2013.01); *G01D 5/145* (2013.01); *G01L 5/221* (2013.01); *G01D 5/2451* (2013.01)

(58) Field of Classification Search
CPC .......... B62D 6/00; B62D 6/10; B62D 5/0463; B62D 15/021; G01D 5/145; G01D 5/147; G01D 5/12; G01L 5/221
See application file for complete search history.

(56) References Cited

U.S. PATENT DOCUMENTS 5,783,893 A * 7/1998 Dade ............... H02K 16/00
310/114
7,952,252 B2 * 5/2011 Kang ............... H02K 21/145
310/216.015
(Continued)

FOREIGN PATENT DOCUMENTS

KR    10-2009-0002876    1/2009
KR    10-2013-0077872    7/2013
KR    10-2017-0082718    7/2017

OTHER PUBLICATIONS

Office Action dated Jan. 25, 2022 for Korean Patent Application No. 10-2017-0145701 and its English machine translation from Global Dossier.

*Primary Examiner* — Ig T An
(74) *Attorney, Agent, or Firm* — Ladas & Parry, LLP (57) ABSTRACT

Provided are an apparatus for detecting a steering angle, a steering system, and a torque sensing method of the steering system. The apparatus includes a rotor formed in a cylindrical shape having a central region, in which a space for housing a rotary shaft is formed, and configured to have a plurality of permanent magnets of different polarities alternately disposed at regular intervals in a circumferential direction, a stator body formed in a cylindrical shape having a space for housing the rotor, and two stator rings formed in ring shapes coupled to the stator body and disposed at a certain distance in a longitudinal direction of the rotary shaft. Accordingly, it is possible to calculate an accurate torque, and a response rate is increased so that stability and performance of the steering system can be improved.

12 Claims, 9 Drawing Sheets

(51) Int. Cl.
*G01D 5/14* (2006.01)
*B62D 5/04* (2006.01)
*B62D 15/02* (2006.01)
*G01D 5/245* (2006.01)

(56) References Cited

U.S. PATENT DOCUMENTS

| | | | | |
|---|---|---|---|---|
| 2008/0250873 | A1* | 10/2008 | Prudham | G01L 3/104 |
| | | | | 73/862.334 |
| 2012/0112582 | A1* | 5/2012 | Kim | B62D 5/0403 |
| | | | | 310/71 |
| 2013/0038152 | A1* | 2/2013 | Woo | H02K 3/522 |
| | | | | 310/71 |
| 2013/0169270 | A1* | 7/2013 | Delbaere | G01D 5/24409 |
| | | | | 324/207.25 |
| 2015/0318772 | A1* | 11/2015 | Jahshan | B60L 15/025 |
| | | | | 318/400.41 |
| 2016/0097655 | A1* | 4/2016 | Hernandez-Oliver | G01B 7/30 |
| | | | | 324/207.25 |
| 2016/0378131 | A1* | 12/2016 | Battlogg | F16H 59/0217 |
| | | | | 74/553 |
| 2020/0059138 | A1* | 2/2020 | Kim | H02K 1/185 |
| 2020/0217731 | A1* | 7/2020 | Toyama | B62D 15/022 |

\* cited by examiner

FIG. 9

APPARATUS FOR DETECTING STEERING ANGLE, STEERING SYSTEM, AND TORQUE SENSING METHOD OF STEERING SYSTEM

CROSS REFERENCE TO RELATED APPLICATION

This application claims priority from Korean Patent Application No. 10-2017-0145701, filed on Nov. 3, 2017, which is hereby incorporated by reference for all purposes as if fully set forth herein.

BACKGROUND OF THE INVENTION

1. Field of the Invention

The present disclosure relates to an apparatus for detecting a steering angle, a steering system, and a torque sensing method of the steering system, and more particularly, to a method of calculating a steering angle simply and accurately using a magnetic field generated by rotation of a steering shaft caused by operation of a steering wheel.

2. Description of the Prior Art

In general, an electric power steering (EPS) system, is installed in a vehicle to facilitate control of a steering wheel, and the EPS assists a driver's steering force using a turning force of a motor.

Driving of the motor is controlled by an electronic control unit (ECU). The ECU receives a signal from a steering angle sensor, a torque sensor, a vehicle velocity sensor, etc. to calculate a current value and provides the current value to the motor to adjust the feeling of steering with the steering wheel.

A steering angle detection apparatus frequently used in such an EPS system is based on a contactless inductive position sensor (CIPOS). A 20-degree rotor is coupled to an input shaft of a steering shaft, and a 40-degree rotor is coupled to an output shaft. A torque sensor indirectly acquires angluar information of the input shaft and the output shaft through electrical excitation, and the acquired angular information is transferred to an ECU. The ECU calculates a torque applied by a driver using an angular difference between the input shaft and the output shaft.

The method of acquiring an angle between the input shaft and the output shaft through electrical excitation may cause a common cause failure of an excitation circuit and shows slow responses.

SUMMARY OF THE INVENTION

In this background, the present disclosure is to provide a steering angle detection apparatus and a steering system for increasing a response rate of torque sensing and a torque sensing method of the steering system by providing a structure of a steering angle detection apparatus and a torque sensing method for sensing a torque simply and accurately.

To solve the foregoing problem, an embodiment provides an apparatus for detecting a steering angle, the apparatus including: a rotor formed in a cylindrical shape having a central region, in which a space for housing a rotary shaft is formed, and configured to have a plurality of permanent magnets of different polarities alternately disposed at regular intervals in a circumferential direction; a stator body formed in a cylindrical shape having a space for housing the rotor; and two stator rings formed in ring shapes coupled to the stator body and disposed at a certain distance in a longitudinal direction of the rotary shaft.

Another embodiment provides a steering system including: a steering angle detection apparatus including a rotor in which a plurality of permanent magnets of different polarities are alternately disposed at regular intervals in a circumferential direction, a stator body formed in a cylindrical shape having a space for housing the rotor, one pair of stator rings formed in ring shapes coupled to the stator body and disposed at a certain distance in a longitudinal direction of a rotary shaft, and one pair of magnetic sensors installed at a certain distance from each other in a circumferential direction of the pair of stator rings on external sides of the pair of stator rings and configured to sense magnetic fields generated when the rotor rotates; a torque calculator configured to calculate a torque using a difference between the magnetic fields of the pair of stator rings sensed by the pair of magnetic sensors; and a steering controller configured to set a target torque to be output from a steering motor according to a driver's operation of a steering wheel on the basis of the calculated torque, apply a current to the steering motor, compare the target torque and an actual torque of the steering motor detected after the steering motor is driven, and feed a comparison result back.

Still another embodiment provides a torque sensing method of a steering system including a steering angle detection apparatus including a rotor in which a plurality of permanent magnets of different polarities are alternately disposed at regular intervals in a circumferential direction, a stator body formed in a cylindrical shape having a space for housing the rotor, one pair of stator rings formed in ring shapes coupled to the stator body and disposed at a certain distance in a longitudinal direction of a rotary shaft, and one pair of magnetic sensors installed at a certain distance from each other in a circumferential direction of the pair of stator rings on external sides of the pair of stator rings: the method including: a sensing operation of sensing magnetic fields for each of the pair of stator rings generated when the rotor rotates according to a driver's operation of a steering wheel; and a torque calculation operation of calculating a target torque of a steering motor using a difference between the sensed magnetic fields for each of the pair of stator rings.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, number, or the like of elements. It should be noted that when one component is described as being "connected," "coupled," or "joined" to another component, still another component may be "connected," "coupled," or "joined" between the two components, even though the component may be directly "connected," "coupled," or "joined" to the other component.

Figure 1:
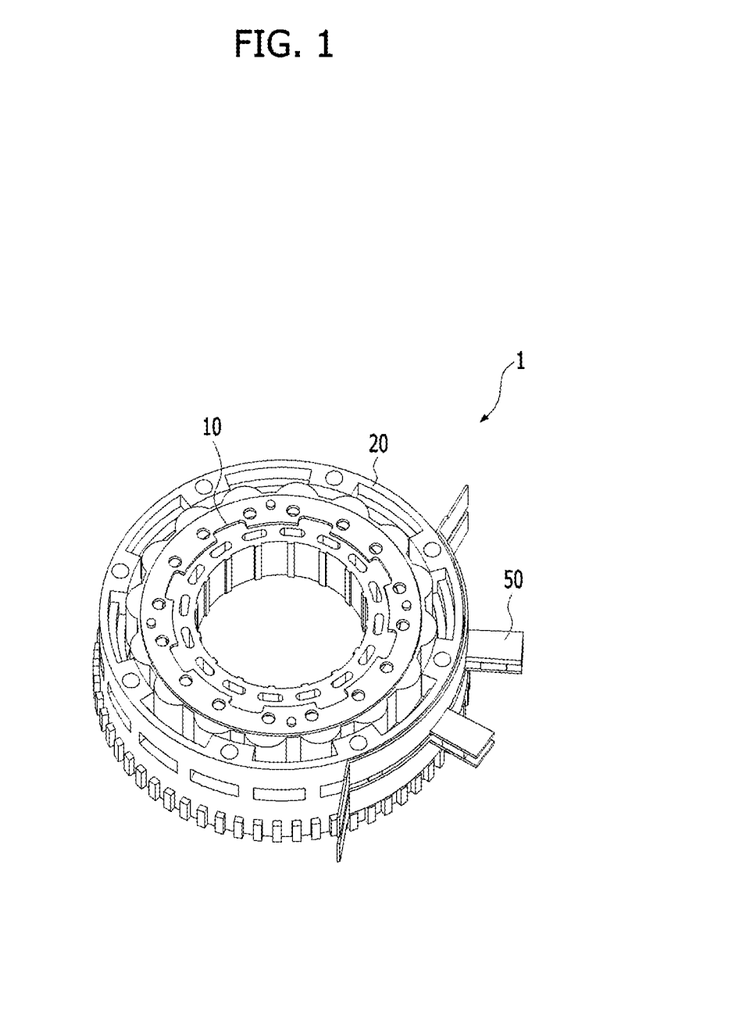
FIG. 1 is a combined perspective view of an apparatus for detecting a steering angle according to an embodiment of the present disclosure.
Figure 2:
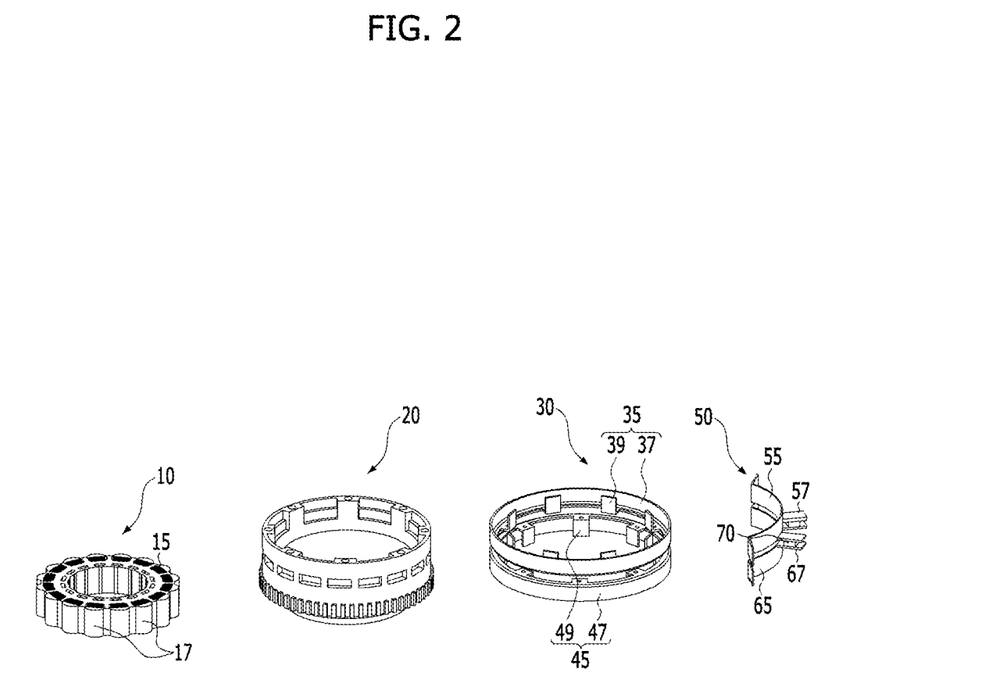
FIG. 2 is an exploded perspective view of the apparatus of FIG. 1.
Figure 3:
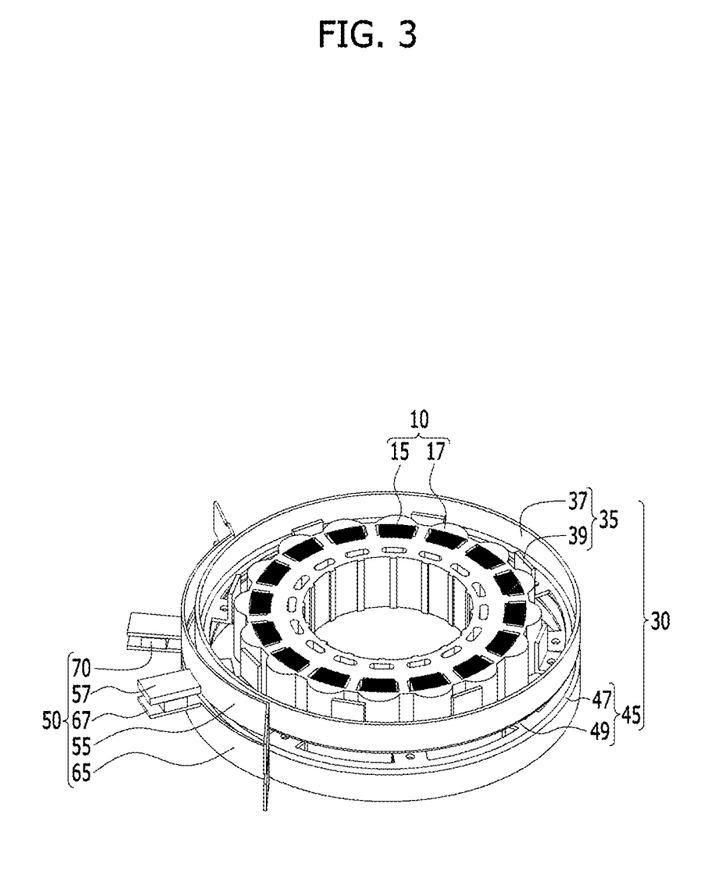
FIG. 3 is a perspective view of the apparatus of FIG. 1 from which a stator body has been removed.
Figure 4:
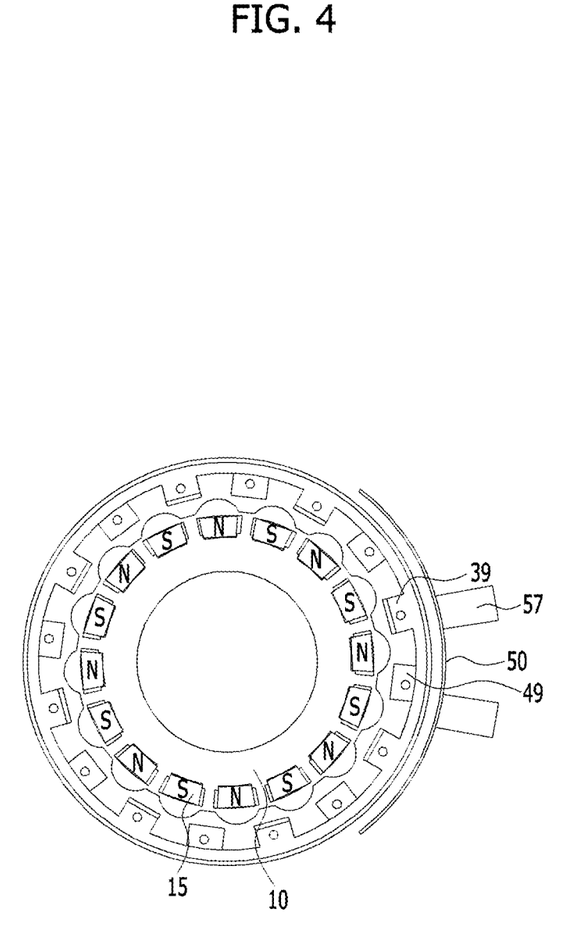
FIG. 4 is a front view of FIG. 3.

FIG. 1 is a combined perspective view of an apparatus for detecting a steering angle (referred to as "steering angle detection apparatus" below) according to an embodiment of the present disclosure, and FIG. 2 is an exploded perspective view of the steering angle detection apparatus of FIG. 1. FIG. 3 is a perspective view of the steering angle detection apparatus of FIG. 1 from which a stator body has been removed, and FIG. 4 is a front view of FIG. 3.

A steering angle detection apparatus 1 according to an embodiment of the present disclosure may include a rotor 10 into which permanent magnets 15 of an interior permanent magnet (IPM) type are inserted, a stator body 20, and one pair of stator rings 30 which are coupled to the stator body 20 and separately disposed in an axial direction of a rotary shaft of the steering angle detection apparatus 1. A sensing device 50 for sensing a magnetic field of the steering angle detection apparatus 1 is installed on the pair of stator rings 30.

The rotor 10 is formed in a cylindrical shape, and a cylindrical space is formed in the longitudinal direction of the rotor 10 in the central region of the rotor 10 to dispose a steering shaft. South permanent magnets 15 and north permanent magnets 15 are alternately disposed in a circumferential direction of the cylinder on the external circumferential surface of the rotor 10. Protrusions 17 protruding in a semicircle shape are formed on the external circumferential surface of the rotor 10 in a longitudinal direction of the rotor 10 in which the respective permanent magnets 15 are disposed, and there are as many protrusions 17 formed as there are permanent magnets 15 in a circumferential direction of the rotor 10.

The rotor 10 may be formed from SiFe. SiFe is a material having a very low magnetic resistance and serves to minimize an Eddy current of the rotor 10 and removes axial magnetic flux.

A stator 20 and 30 may include the stator body 20 formed from plastic and the pair of stator rings 30 attached to the external circumferential surface of the stator body 20.

The stator body 20 is formed in a cylindrical ring shape having a central region, in which a housing space for housing the rotor 10 is formed, and may be manufactured by plastic molding.

Each of the pair of stator rings 30 is formed in a circular ring shape on the external circumferential surface of the stator body 20, and the pair of stator rings 30 are separately disposed at a certain distance in a longitudinal direction of the rotary shaft of the steering angle detection apparatus 1 on the external circumferential surface of the stator body 20. While the pair of stator rings 30 are vertically disposed on a projected structure, the stator body 20 is molded with plastic such that the pair of stator rings 30 and the stator body 20 may be manufactured as one structure.

In the pair of stator rings 30, a stator ring 30 disposed up is referred to as an upper stator ring 35, and a stator ring 30 disposed down is referred to as a lower stator ring 45.

The upper stator ring 35 has an upper ring section 37 of a ring shape having a certain width in the up-down direction of the stator body 20. At the lower end of the upper ring section 37 of the upper stator ring 35, upper fixing segments 39, which protrude toward the inside of the upper ring section 37 and then bend upward, are formed. The plurality of upper fixing segments 39 are formed at regular intervals in a circumferential direction of the upper stator ring 35.

The lower stator ring 45 has a lower ring section 47 of a ring shape having a certain width in the up-down direction of the stator body 20. At the upper end of the lower ring section 47 of the lower stator ring 45, lower fixing segments 49, which protrude toward the inside of the lower ring section 47 and then bend downward, are formed. The plurality of lower fixing segments 49 are formed at regular intervals in a circumferential direction of the lower stator ring 45.

The upper fixing segments 39 may be formed in the same number as the lower fixing segments 49. When free-edge portions, which are bent from the upper fixing segments 39 or the lower fixing segments 49 and formed in parallel with the upper ring section 37 or the lower ring section 47, are integrally molded together with the stator body 20, the free-edge portions are exposed to the internal side surface of the stator body 20. Accordingly, when the rotor 10 rotates, the free-edge portions form a magnetic field together with the rotor 10. Here, the total number of upper fixing segments 39 and the lower fixing segments 49 may be equal to the number of permanent magnets 15 of the rotor 10 or a multiple thereof.

Meanwhile, when the upper stator ring 35 and the lower stator ring 45 are integrally molded together with the stator body 20 during injection molding of the stator body 20, the upper fixing segments 39 of the upper stator ring 35 and the lower fixing segments 49 of the lower stator ring 45 are alternately disposed at regular intervals. In other words, as shown in FIG. 4, the upper fixing segments 39 and the lower fixing segments 49 are fixed to be alternately disposed in the front view.

The upper stator ring 35 and the lower stator ring 45 are manufactured with SiFe like the rotor 10 and may form no directivity in the stator rings 30 without magnetic bias and reduce hysteresis.

A sensing device 50, which senses a magnetic field flowing through the rotor 10, the upper stator ring 35, and the lower stator ring 45 and allows torque calculation of the steering angle detection apparatus 1, is installed on the upper stator ring 35 and the lower stator ring 45.

The sensing device 50 may include one pair of sensor guides 55 and 65, which are fixed at the upper stator ring 35 and the lower stator ring 45, respectively, and guide the magnetic field, and one pair of magnetic sensors 70 installed on the sensor guides 55 and 65.

The sensor guides 55 and 65 include an upper guide 55 and a lower guide 65. The upper guide 55 and the lower guide 65 are coupled to the external circumferential surfaces of the upper stator ring 35 and the lower stator ring 45, respectively. The upper guide 55 and the lower guide 65 are formed in the shapes of arcs which are curved along the external circumferential surfaces of the upper stator ring 35 and the lower stator ring 45, respectively.

When the rotor 10 rotates by a user's operation of a steering wheel, a change in a magnetic field vector made by the magnets 15 in the rotor 10 is transferred to each of the fixed upper stator ring 35 and lower stator ring 45. The upper guide 55 and the lower guide 65 may operate as flux collectors which transfer magnetic fields each transferred to the two stator rings 35 and 45 to the magnetic sensors 70. It is possible to sense an angle by which the rotor 10 has been rotated using a difference between the magnetic fields of the upper stator ring 35 and the lower stator ring 45 transferred to the magnetic sensors 70.

One pair of upper guide segments 57 are formed to protrude outward from the upper guide 55 at the lower end of the upper guide 55 and are disposed at a certain distance in the longitundinal direction of the upper guide 55. Also, one pair of lower guide segments 67 are formed to protrude outward from the lower guide 65 at the upper end of the lower guide 65 and are disposed at a certain distance in the longitundinal direction of the lower guide 65. The single upper guide segments 57 of the upper guide 55 and the single lower guide segments 67 of the lower guide 65 are formed at positions corresponding to each other.

As shown in FIG. 4, when the upper guide 55 and the lower guide 65 are coupled to the upper stator ring 35 and the lower stator ring 45, one pair in the pair of upper guide segments 57 and the pair of lower guide segments 67 is disposed between one of the upper fixing segments 39 of the upper stator ring 35 and a lower fixing segment 49 of the lower stator ring 45 neighboring thereto, and the other one pair in the pair of upper guide segments 57 and the pair of lower guide segments 67 is disposed between the neighboring lower fixing segments 49 of the lower stator ring 45 and an upper fixing segment 39 of the upper stator ring 35 neighboring thereto. Accordingly, the pair of upper guide segments 57 and the pair of lower guide segments 67 are disposed to be spaced by the distance between the upper fixing segments 39 or the lower fixing segments 49 from each other.

The magnetic sensors 70 are separately installed between the pair of upper guide segments 57 of the upper guide 55 and between the pair of lower guide segments 67 of the lower guide 65. Accordingly, the pair of magnetic sensors 70 may be disposed at a certain distance on the external sides of the upper stator ring 35 and the lower stator ring 45 between the upper stator ring 35 and the lower stator ring 45. Hall sensors may be used as the magnetic sensors 70, and the hall sensors sense changes in magnetic field vectors when the rotor 10 rotates.

Figure 5:
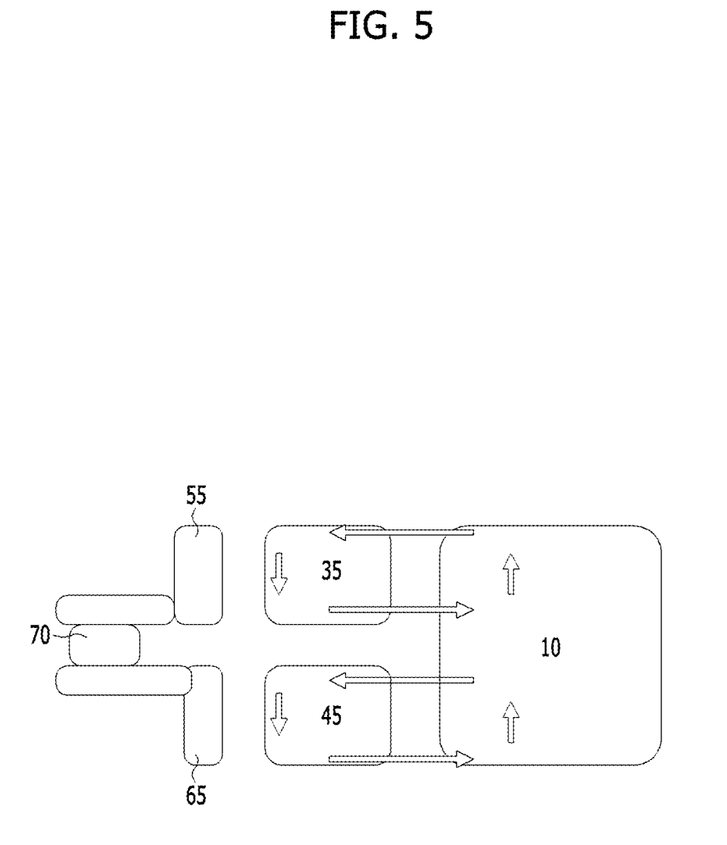
FIG. 5 is a diagram of an apparatus for detecting a steering angle, showing magnetic fields formed along respective stator rings according to an embodiment of the present disclosure.
Figure 6:
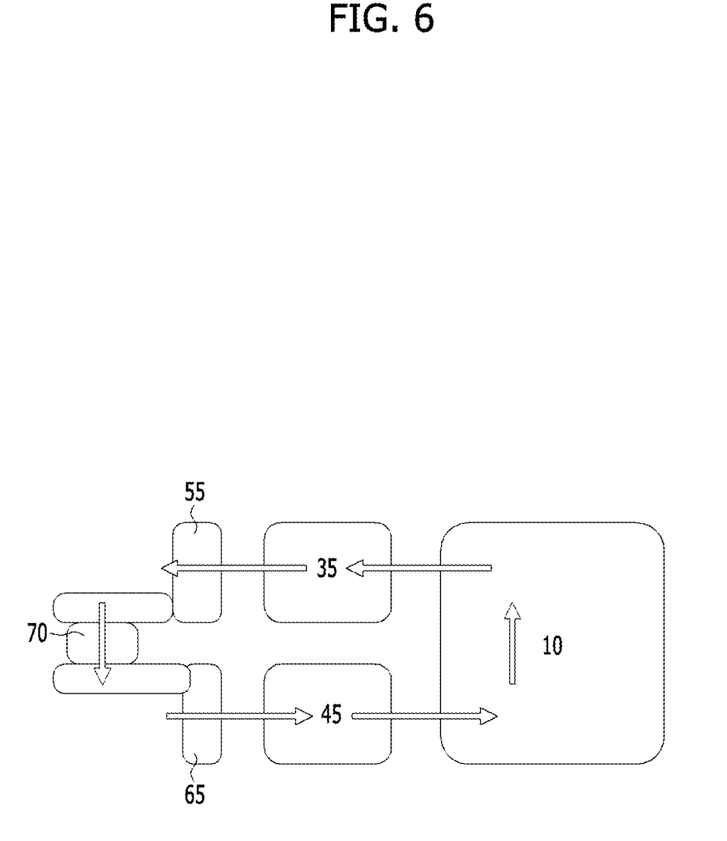
FIG. 6 is a diagram of an apparatus for detecting a steering angle, showing a magnetic field formed in the apparatus according to an embodiment of the present disclosure.

In the steering angle detection apparatus 1 according to an embodiment of the present disclosure, the permanent magnets 15 are inserted into the rotor 10, and the pair of stator rings 30 fixed at a plastic mold is disposed on the external circumferential surface of the rotor 10. Due to this configuration, when the rotor 10 rotates, magnetic fields generated by the permanent magnets 15 are transferred to the upper stator ring 35 and the lower stator ring 45 as shown in FIG. 5. In other words, a magnetic field is formed between an upper region of the rotor 10 and the upper stator ring 35, and another magnetic field is formed between a lower region of the rotor 10 and the lower stator ring 45. In the overall steering angle detection apparatus 1, as shown in FIG. 6, a magnetic field is formed along the rotor 10, the upper stator ring 35, the upper guide 55, the pair of magnetic sensors 70, the lower guide 65, the lower stator ring 45, and the rotor 10 due to the pair of magnetic fields.

At this time, as shown in FIG. 4, a permanent magnet 15 of the rotor 10 adjacent to an upper fixing segment 39 of the upper stator ring 35 and a permanent magnet 15 of the rotor 10 adjacent to a lower fixing segment 49 of the lower stator ring 45 have different polarities. Accordingly, there is a magnetic field difference between the upper stator ring 35 and the lower stator ring 45.

Figure 7:
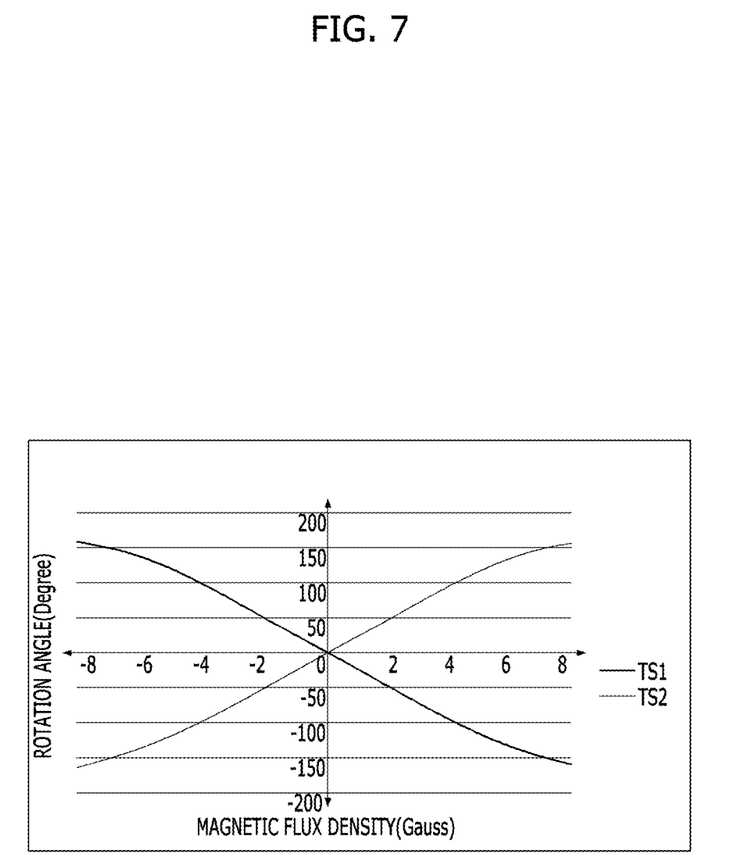
FIG. 7 is a graph showing relationships between magnetic flux densities sensed by one pair of magnetic sensors and a rotation angle of a rotor provided in an apparatus for detecting a steering angle according to an embodiment of the present disclosure.

The magnetic fields formed by the upper stator ring 35 and the lower stator ring 45 are each sensed by the pair of magnetic sensors 70. As shown in FIG. 7, when a rotation angle of the rotor 10 is 0, magnitudes of the magnetic fields sensed by the pair of magnetic sensors 70 are 0. However, when the rotor 10 starts rotating, the magnetic fields which have the opposite polarities and similar magnitudes are each sensed by the magnetic sensors 70, and it is possible to determine a rotation angle of the rotor 10 using the sensed magnetic fields.

Figure 8:
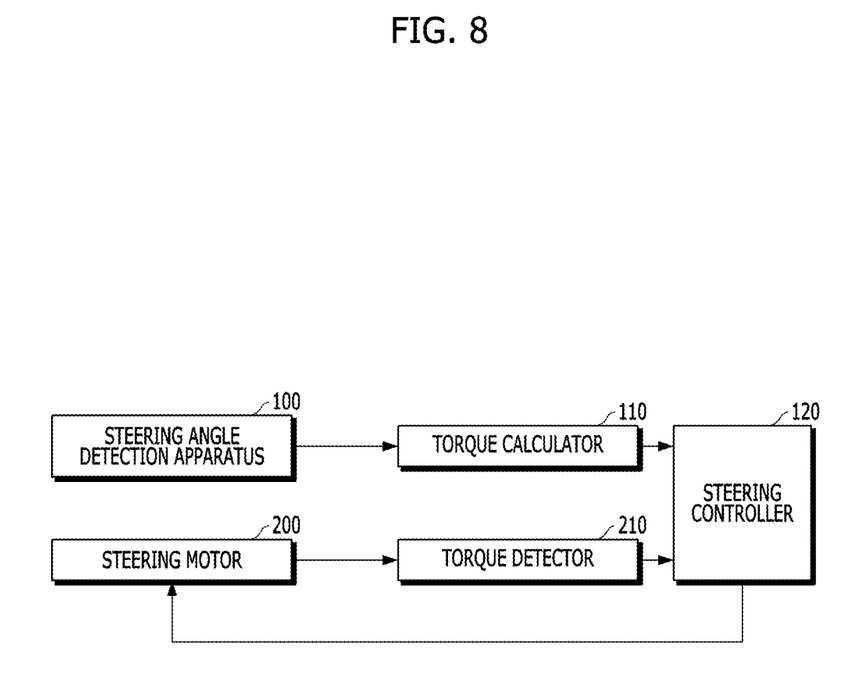
FIG. 8 is a block diagram of a steering system including an apparatus for detecting a steering angle according to an embodiment of the present disclosure.

FIG. 8 is a block diagram of a steering system including a steering angle detection apparatus according to an embodiment of the present disclosure.

The steering system may include a steering angle detection apparatus 100, a torque calculator 110, and a steering controller 120.

The steering angle detection apparatus 1 shown in FIGS. 1 to 4 may be used as the steering angle detection apparatus 100. When the rotor 10 of the steering angle detection apparatus 100 rotates according to a driver's steering, magnetic flux densities sensed by one pair of magnetic sensors may be provided to the torque calculator 110.

According to an example, the torque calculator 110 may calculate a torque of the steering angle detection apparatus 100 by inputting magnetic flux densities sensed by the pair of magnetic sensors into Equation 1 below.

$$\text{Torque} = \frac{(TS_1 - TS_2)}{2} * \frac{T_{bar}}{\text{Gain}} \quad \text{[Equation 1]}$$

Here, $TS_1$ and $TS_2$ are magnetic flux densities sensed by respective magnetic sensors. A difference therebetween is averaged so that magnetic flux densities having the opposite polarities may be averaged. Thar is a torsion bar constant, that is a torsion coefficient, and is used to convert a magnetic flux density into a torque. When a torque is calculated using Equation 1, it is possible to determine a torque required to rotate a steering motor 200 by a desired angle. However, Equation 1 is an example, and the present disclosure is not limited thereto. Another known equation may be used as long as it is possible to detect a steering angle or a torque according to a driver's steering using a magnetic field difference sensed by the pair of magnetic sensors 70.

When the steering wheel is operated by a driver, the steering controller 120 may apply a current corresponding to a target torque to the steering motor 200 to output the target torque for a steering angle required by the driver. To determine whether the steering motor 200 outputs the desired target torque, the steering controller 120 may compare an actual torque of the rotating steering motor 200 with the target torque calculated by the torque calculator 110 using Equation 1.

Figure 9:
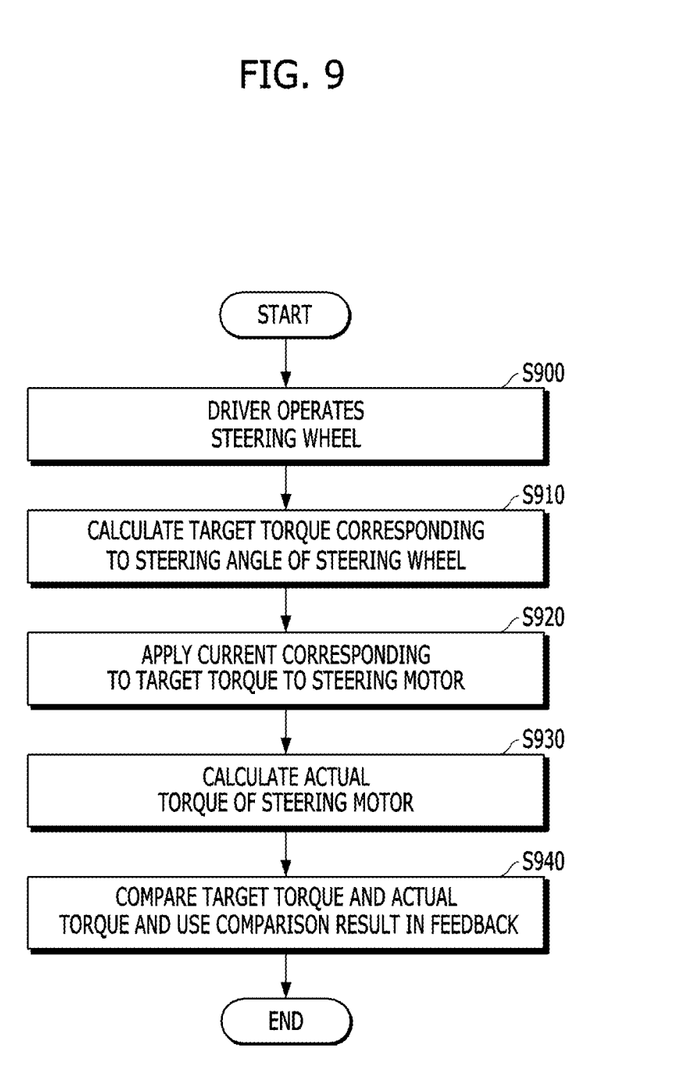
FIG. 9 is a flowchart of a process in which a steering system controls a steering motor and senses a target torque of the steering motor according to an embodiment of the present disclosure.

A process in which the steering system having such a configuration controls the steering motor 200 and senses a torque of the steering angle detection apparatus 100 will be described below with reference to FIG. 9.

When the driver operates the steering wheel (S900), the steering controller 120 may calculate a target torque according to a steering angle of the steering wheel (S910) and apply a current corresponding to the target torque to the steering motor 200 (S920).

When the steering motor 200 rotates upon application of the current, a torque detector 210 may calculate an actual torque of the steering motor 200 (S930). The calculated actual torque may be provided to the steering controller 120, and the steering controller 120 may compare the target torque with the actual torque and use a comparison result in feedback for controlling a current provided to the steering motor 200 (S940).

As described above, the steering angle detection apparatus 1 according to an embodiment of the present disclosure includes the rotor 10 including the permanent magnets 15 and the pair of stator rings 30 separately disposed vertically, and a plurality of fixing segments 39 and 49 for forming magnetic fields with the rotor 10 are formed in the respective stator rings 30. Also, the pair of magnetic sensors 70 are provided on the external sides of the upper stator ring 35 and the lower stator ring 45 so that magnetic flux densities may be sensed from the upper stator ring 35 and the lower stator ring 45.

In the steering system including the steering angle detection apparatus 1 as the steering angle detection apparatus 100, a torque of the steering angle detection apparatus 100 can be calculated using a difference between magnetic fields sensed by the magnetic sensors 70 so that a torque of the steering angle detection apparatus 100 can be calculated simply and accurately. In other words, according to an embodiment of the present disclosure, the pair of stator rings 30 are provided, and a torque of the steering angle detection apparatus 100 is calculated with a simple configuration and method for sensing magnetic fields at the respective stator rings 30. Therefore, it is possible to accurately calculate the torque, and a response rate is increased so that stability and performance of the steering system can be improved.

As described above, according to embodiments of the present disclosure, a steering angle detection apparatus is configured to include one pair of stator rings, and a torque of a steering motor is calculated with a simple configuration and method for sensing a magnetic field formed by the pair of stator rings. Therefore, it is possible to calculate an accurate torque, and a response rate is increased so that stability and performance of a steering system can be improved.

The standard details or standard documents mentioned in the above embodiments are omitted for the simplicity of the description of the specification, and constitute a part of the present specification. Therefore, when a part of the contents of the standard details and the standard documents is added to the present specification or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An apparatus for detecting a steering angle, the apparatus comprising:
   a rotor formed in a cylindrical shape having a central region, in which a space for housing a rotary shaft is formed, the rotor configured to be rotatable with the rotary shaft and having a plurality of permanent magnets of different polarities alternately disposed at regular intervals in a circumferential direction;
   a stator body formed in a cylindrical shape having an inner space for housing the rotor at a center of the stator body; and
   two stator rings coupled to the stator body and formed in a ring shape disposed at a certain distance in a longitudinal direction of the rotary shaft, the two stator rings having another inner space for housing the rotor at a center of the two stator rings, wherein the two stator rings receive a magnetic field from the permanent magnets and transfer the magnetic field to magnetic sensors,
   wherein the rotor is disposed in the inner space of the stator body and the two stator rings at the center of the stator body and the two stator rings,
   wherein the two stator rings are formed in the ring shape surrounding an external circumferential surface of the stator body and include an upper stator ring coupled to an upper portion of the stator body and a lower stator ring coupled to a lower portion of the stator body at a certain distance from the upper stator ring,
   wherein the upper stator ring includes:
   an upper ring section of the ring shape coming in contact with the external circumferential surface of the stator body; and
   a plurality of upper fixing segments formed in a circumferential direction of the upper ring section and configured to extend inward from a lower end of the upper ring section and bend upward,
   wherein the lower stator ring includes:
   a lower ring section of the ring shape coming in contact with the external circumferential surface of the stator body; and
   a plurality of lower fixing segments formed in a circumferential direction of the lower ring section and configured to extend inward from an upper end of the lower ring section and bend downward,
   wherein the total number of the plurality of upper fixing segments and the plurality of lower fixing segments is equal to the number of the plurality of permanent magnets of the rotor or a multiple thereof.

2. The apparatus of claim 1, wherein the stator body is formed by plastic molding, and the pair of stator rings are molded together with the stator body and coupled to the stator body.

3. The apparatus of claim 1, wherein the pair of stator rings are molded together with the stator body, and the upper stator ring and the lower stator ring are disposed so that the upper fixing segments and the lower fixing segments alternate with each other.

4. The apparatus of claim 3, wherein free-edge portions of the upper fixing segments and the lower fixing segments are exposed to an internal side surface of the stator body in which the rotor is disposed.

5. The apparatus of claim 1, further comprising:
an arc-shaped upper guide and lower guide separately coupled to external circumferential surfaces of the pair of stator rings; and
one pair of the magnetic sensors installed between the upper guide and the lower guide and configured to sense magnetic fields generated by the motor.

6. The apparatus of claim 5, wherein one pair of upper guide segments are formed on the upper guide at a certain distance from each other to protrude outward from a lower end of the upper guide, and
one pair of lower guide segments are formed on the lower guide at a certain distance from each other to protrude outward from an upper end of the lower guide.

7. The apparatus of claim 5, wherein the magnetic sensors are separately installed between the pair of upper guide segments and between the pair of lower guide segments.

8. The apparatus of claim 5, wherein magnetic fields of opposite polarities are sensed by the pair of magnetic sensors.

9. A steering system comprising:
a steering angle detection apparatus including a rotor in which a plurality of permanent magnets of different polarities are alternately disposed at regular intervals in a circumferential direction, wherein the rotor is configured to be rotatable with a rotary shaft, a stator body formed in a cylindrical shape having an inner space for housing the rotor at a center of the stator body, one pair of stator rings formed in ring shapes coupled to the stator body, disposed at a certain distance in a longitudinal direction of the rotary shaft and having another inner space for housing the rotor at a center of the pair of stator rings, and one pair of magnetic sensors installed at a certain distance from each other in a circumferential direction of the pair of stator rings on external sides of the pair of stator rings and configured to sense magnetic fields generated when the rotor rotates, wherein the rotor is disposed in the inner space of the stator body and the pair of stator rings at the center of the stator body and the pair of stator rings, wherein the stator rings receive the magnetic field from the permanent magnets and transfer the magnetic field to the pair of magnetic sensors;
a torque calculator configured to calculate a torque using a difference between the magnetic fields of the pair of stator rings sensed by the pair of magnetic sensors; and
a steering controller configured to set a target torque to be output from a steering motor according to a driver's operation of a steering wheel based on the calculated torque, apply a current to the steering motor, compare the target torque and an actual torque of the steering motor detected after the steering motor is driven, and feed a comparison result back,
wherein the one pair of stator rings are formed in the ring shape surrounding an external circumferential surface of the stator body and include an upper stator ring coupled to an upper portion of the stator body and a lower stator ring coupled to a lower portion of the stator body at a certain distance from the upper stator ring,
wherein the upper stator ring includes:
an upper ring section of the ring shape coming in contact with the external circumferential surface of the stator body; and
a plurality of upper fixing segments formed in a circumferential direction of the upper ring section and configured to extend inward from a lower end of the upper ring section and bend upward,
wherein the lower stator ring includes:
a lower ring section of the ring shape coming in contact with the external circumferential surface of the stator body; and
a plurality of lower fixing segments formed in a circumferential direction of the lower ring section and configured to extend inward from an upper end of the lower ring section and bend downward,
wherein the total number of the plurality of upper fixing segments and the plurality of lower fixing segments is equal to the number of the plurality of permanent magnets of the rotor or a multiple thereof.

10. A torque sensing method of a steering system including a steering angle detection apparatus including a rotor in which a plurality of permanent magnets of different polarities are alternately disposed at regular intervals in a circumferential direction, wherein the rotor is configured to be rotatable with a rotary shaft, a stator body formed in a cylindrical shape having an inner space for housing the rotor at a center of the stator body, one pair of stator rings formed in ring shapes coupled to the stator body, disposed at a certain distance in a longitudinal direction of a rotary shaft and having another inner space for housing the rotor at a center of the pair of stator rings, wherein the rotor is disposed in the inner space of the stator body and the pair of stator rings at the center of the stator body and the pair of stator rings, and one pair of magnetic sensors installed at a certain distance from each other in a circumferential direction of the pair of stator rings on external sides of the pair of stator rings, wherein the pair of stator rings receive a magnetic field from the permanent magnets and transfer the magnetic field to the pair of magnetic sensors, the method comprising:
sensing magnetic fields for each of the pair of stator rings generated when the rotor rotates according to a driver's operation of a steering wheel; and
calculating a target torque of a steering motor using a difference between the sensed magnetic fields for each of the pair of stator rings,
wherein the pair of stator rings are formed in the ring shape surrounding an external circumferential surface of the stator body and include an upper stator ring coupled to an upper portion of the stator body and a lower stator ring coupled to a lower portion of the stator body at a certain distance from the upper stator ring,
wherein the upper stator ring includes:
an upper ring section of the ring shape coming in contact with the external circumferential surface of the stator body; and
a plurality of upper fixing segments formed in a circumferential direction of the upper ring section and configured to extend inward from a lower end of the upper ring section and bend upward,
wherein the lower stator ring includes:

a lower ring section of the ring shape coming in contact with the external circumferential surface of the stator body; and a plurality of lower fixing segments formed in a circumferential direction of the lower ring section and configured to extend inward from an upper end of the lower ring section and bend downward, wherein the total number of the plurality of upper fixing segments and the plurality of lower fixing segments is equal to the number of the plurality of permanent magnets of the rotor or a multiple thereof.

11. The torque sensing method of claim 10, wherein the sensing of the magnetic fields comprises sensing, by the pair of magnetic sensors, the magnetic fields of opposite polarities.

12. The apparatus of claim 6, wherein the magnetic sensors are separately installed between the pair of upper guide segments and between the pair of lower guide segments.

* * * * *